Figure 1:
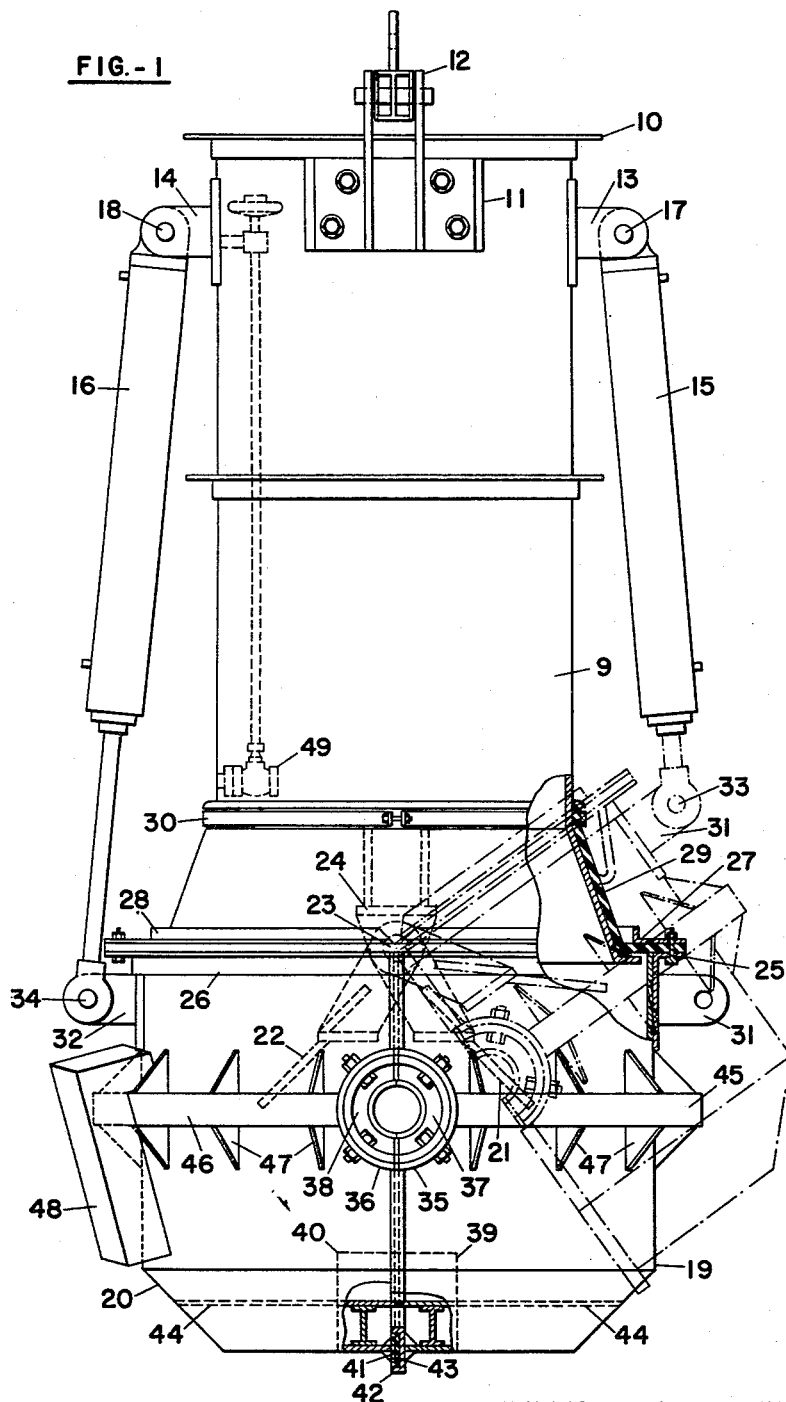

June 7, 1960 W. LAW 2,939,292
CAISSON FOR SUBMERGED PIPELINES
Filed March 10, 1958 3 Sheets-Sheet 1

WILLIAM LAW INVENTOR

BY *W.O.T Heilman* ATTORNEY

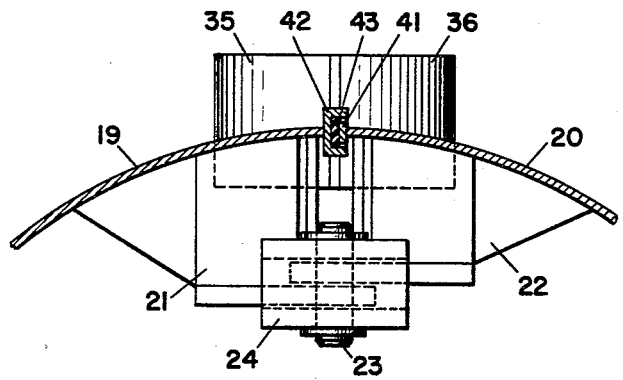
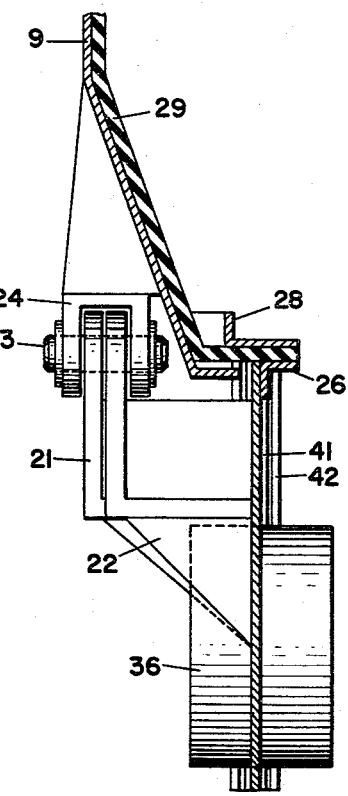
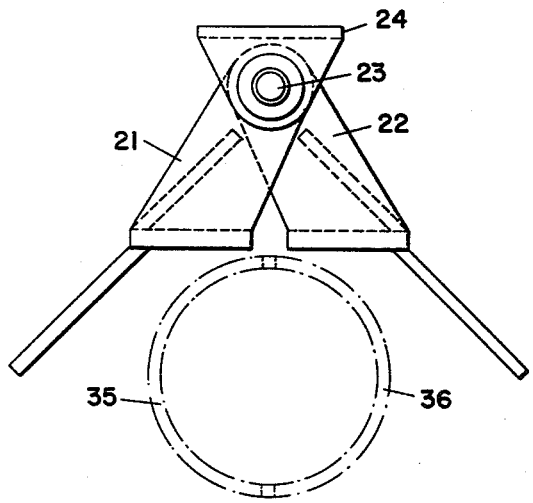

United States Patent Office 2,939,292
Patented June 7, 1960

2,939,292

CAISSON FOR SUBMERGED PIPELINES

William Law, Shreveport, La., assignor to Esso Research and Engineering Company, a corporation of Delaware Filed Mar. 10, 1958, Ser. No. 720,243

15 Claims. (Cl. 61—63)

This invention relates to caissons for underwater construction work. It relates more particularly to caissons specially adapted for work on submerged pipelines. It relates still more particularly to caissons for work on pipelines which are not only submerged but also entrenched, and it relates even still more particularly to caissons for such work which are of unitary construction and are transportable and reusable.

Pipelines are frequently laid with considerable lengths of their runs under water. From time to time it may be necessary to make repairs or connections to such a submerged line. For this work dry access to the section of line in question is usually required. The customary way of providing such access has been to bring a derrick barge over the pipeline and lift the desired section of line onto the barge. Sometimes, where lines of larger size have been involved, it has been necessary to use a three-barge arrangement not only to support the raised line but also to obtain a comparatively straight and unstressed run of pipe in which is to be performed across the middle barge. Such raising of a pipeline, whether for support by one barge or more than one, may subject it to bending stresses sufficient to strain it permanently or even to break it.

After repairs or connections have been made to a raised pipeline, problems may still be encountered in relaying the line. In the original installation a submerged pipeline may not simply be left to lie on the sea bottom; instead, a trench may be dug, the pipeline laid therein, and mud, sand, silt, or other bottom material allowed or forced to flow back into the trench to enclose the pipeline completely. When such a submerged and entrenched line is raised onto a barge it will be disturbed from its bed for some distance on either side of the section desired to be accessible for work. After this work has been completed, the pipeline trench may have to be partially redug where bottom material has washed into it, and the raised run of pipe must be carefully relaid and reenclosed.

From the foregoing the possibility appears that substantial economies could be effected in making repairs and connections to submerged and submerged and entrenched pipelines if the raising of such lines from their subsurface beds could be obviated. Accordingly it is an object of the present invention to provide a caisson method and means for securing dry working access to sections of a submerged or submerged and entrenched pipeline without requiring disturbance of this line from its installed operating location. It is a further object of this invention to provide a caisson means for securing such pipeline access which is easily transportable to be reusable in an indefinite number of locations, and which is easily adjustable to accommodate both a range of diameters of pipelines and a range of depths of water. The invention and its objects will be more fully understood from the following description when it is read in conjunction with and with reference to the accompanying drawings in which:

Fig. 1 represents an exterior side view of the caisson upper and lower base section assembly oriented to show a side aperture for entrance of a horizontal pipe, and cut away to show details of the seal between the upper and lower base sections and that between the lower base section halves. Also outlines are given of a hinge connecting the upper and lower base sections, one of the lower base section halves in open position, and the sleeves defining the bottom aperture for entrance into the caisson of a vertical pipe or pile. A ballasting weight is shown in engaged position.

Figs. 2, 3, and 4 represent top, front, and side views of a hinge connecting the caisson upper and lower base sections.

Figure 5:
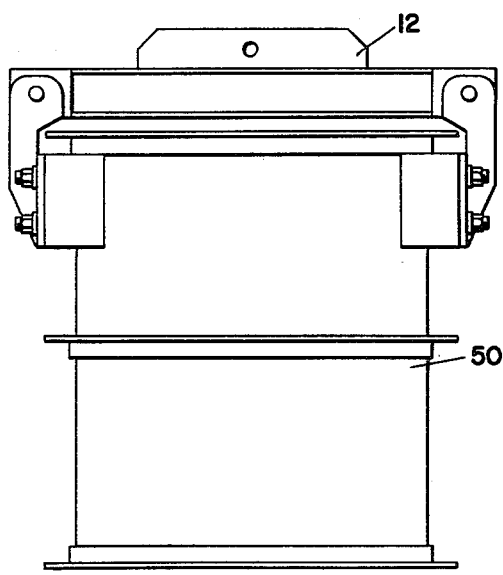

Fig. 5 represents an extension piece for the caisson upper base section with bail attached.

Referring now to Fig. 1, the upper base section 9 of the caisson assembly is in the form of a truncated conical shell having a bottom flange and surmounted by a cylindrical shell. Flange 10 is fitted at the top of the cylindrical region. This flange is suitably drilled for bolted attachment of a mating flange. Just below flange 10 are two diametrically opposite bail attachment pads, the edges of one of which, 11, are visible. The bail assembly 12 for engagement of a derrick hook for hoisting and lowering the caisson is shown in bolted attachment to pad 11. Further illustration of bail 12 is given in Fig. 5. Pad assemblies 13 and 14 are attached rigidly to upper base section 9, and provide upper pivoted mounting points for actuating cylinder assemblies 15 and 16 on pins 17 and 18.

The lower base section of the caisson comprises two opposing shell halves designated 19 and 20. Each of the lower base section halves is attached to the upper base section by two hinges. The design of these hinges may be most clearly understood by reference to Figs. 3, 4 and 5. Certain features of them, however, may be understood from Fig. 1 in which a number of elements comprising one each of the hinges for each of the two lower base section halves are shown in dotted outline. Hinge leaves 21 and 22 are fastened rigidly to the inside of shell halves 19 and 20 respectively, and both turn on hinge pin 23. This pin is secured in hinge bracket 24 which is fixedly mounted to the inside of upper base section 9. It should be noted that the axis of hinge pin 23, the bottom edge of upper base section 9, and the top edges of lower base section shell halves 19 and 20 lie substantially in a common plane, assuming shell halves 19 and 20 to be in their cosed position as they are shown in solid outline in Fig. 1. In their closed position the lower base section halves form a flat rimmed bowl which is concave upward and which has an inside top diameter that is slightly larger than the outside bottom diameter of upper base section 9.

Flanges 25 and 26 are secured to the top edges of shell halves 19 and 20. These are drilled for bolted attachment of semi-circular angle pieces 27 and 28 as shown. Between them these flanges and angle pieces secure watertight the lower end of closure collar 29. This collar is made of flexible material that is impermeable by salt water. It is in the general form of a truncated conical shell having a flange at the bottom and surmounted by a short cylindrical section. The upper end of closure collar 29 is secured watertight to upper base section 9 by tensioning band 30. Intermediate its top cylindrical section and bottom flange, closure collar 29 conforms closely to the conical region of upper base section 10.

Pad assemblies 31 and 32 are fastened to the lower base section halves in vertical line with pads 13 and 14 on the upper base section. Pads 31 and 32 provide lower pivoted mounting points for the actuating cylinder assemblies on pins 33 and 34. The piston elements of these assemblies are preferably actuated by hydraulic fluid, although compressed air might be used. Lower base section half 19 is shown in light dotted outline in its fully open position to indicate, by comparison with its fully closed position, the stroke required of the piston elements of assemblies 15 and 16. In considering lower base section half 19 in open position, note also how closure collar 29 has been partially folded up from the conical region of upper base section 9. The configuration of the closure collar and of the hinged connections between the upper base section and the lower base section halves are such that as the collar is folded up by opening of the lower base sections it will only be flexed and not stretched or twisted.

The mating edges of the lower base section halves are interrupted by paired semi-circular cuts to provide apertures for entrance into the caisson of both horizontal and vertical pipes and piles. These cuts are fitted permanently with semi-cylindrical sleeves which establish a maximum size of pipe which can be accommodated. Sleeves 35 and 36 define one of the apertures for a horizontal pipe, and there would be another pair of such sleeves diametrically opposite from these to allow a horizontal pipeline to pass completely through the caisson. To accommodate a range of sizes of pipelines, sleeves 35 and 36 are provided with a series of adapters 37 and 38 comprising semi-cylindrical shells of varying inside radii lined on the inside with a compressible material. These adapters are attachable to base sleeves 35 and 36 by bolting or other appropriate means.

Semi-cylindrical sleeves defining a bottom aperture to the caisson are designated 39 and 40. These sleeves are provided with adapters similar to those shown for the side apertures. With the side apertures in use, the adapters for sleeves 39 and 40 would be of the kind to completely close the bottom aperture and vice versa. The bottom aperture should be centrally located for greatest accessibility of pipes or piles brought up through it. Likewise, the side apertures should be at such height above the bottom of the lower case section that a horizontal pipe line pasing through them will be conveniently exposed for work.

Between the semi-cylindrical cuts for pipe apertures, the mating edges of the lower base section halves are provided with means for obtaining a watertight interface between them when the lower base section halves are in closed position. These means comprise flat bar flange segments 41 along the mating edge of one lower base section half, channel flange segments 42 along the mating edge of the other lower base section half, and a lining of compressible material 43 in the channel flange. On the inside each lower base section half is fitted with floor plates 44 laid over bottom structural members. These plates are perforated for water drainage.

Circumferentially disposed around the outside of lower base section shell halves 19 and 20 are structural bands 45 and 46 which are supported on a series of brackets 47 creating a number of bottomless pockets between the brackets. These pockets are for the accommodation of caisson ballasting weights which make hooked engagement with bands 45 and 46. One such weight 48 is shown in engaged position in Fig. 1. In addition, in Fig. 1 notice valve 49 which is shown in dotted outline installed on a pipe nipple penetrating the shell of upper base section 9. Valve 49 discharges directly into the caisson, and is accordingly a scuttle or flooding valve. Its stem is carried to the top of upper base section 9 or any extension pieces attached thereto in a series of extension rods so that valve 49 may always be operated from the surface.

Now refer to Figs. 2, 3 and 4 which are top, front, and side views of the hinge connection between the upper base section 9 and the lower base section shell halves 19 and 20 which is shown in front view outline in Fig. 1. This hinge arrangement is one of two which connect the lower base section halves with the upper base section. The other is diametrically opposite across the caisson from the one shown.

Referring to Fig. 5 which shows an extension piece for the caisson upper base section and an attached bail, 50 is the extension piece itself comprising a cylindrical shell having top and bottom flanges and two bail attachment pads. The diameter of the shell, drilling of the flanges, and disposition of the bail attachment pads correspond to these features of the cylindrical region of upper base section 9, flange 10, and bail attachment pad 11. Extension pieces are attached to the top of upper base section 9 and to each other by bolting of mating flanges. An assembly of the basic caisson and extension pieces may be made to any practicable height to exceed the depth of water in which a pipe line is lying. Limits of height are determined by buoyancy, ballasting, and stability conditions.

Although not indicated in any of the drawings, there will be certain fittings of a standard nature in the caisson upper and lower base sections and in the extension pieces. To provide access to the working platform 44 ladder means are necessary. Accordingly there will be fixed ladder sections in each extension piece and in the caisson upper base section. A swinging detachable ladder section should be provided at the lower end of the last fixed section to come down finally on perforated floor 44.

For drainage of the caisson, pumping means are necessary. Considering that the basic caisson may be built up with extension pieces to a height in excess of that through which a pump at the water surface could draw, it will be desirable to have a pump installed permanently in a sump in one of the lower base section halves. Since such a pump will have to operate fully submerged, it should be a fluid operated device. An air driven sump pump will be suitable. For such a device there should be air supply and water discharge piping installed permanently in each extension piece and in the caisson upper base section. The lowest sections of the air and water lines, the ones making connection to the pump, should be flexible.

Finally there must be flexible hoses to supply and exhaust hydraulic fluid to and from the actuating cylinder assemblies 15 and 16. Connecting nipples for these hoses appear at top and bottom of these cylinders. The hydraulic hoses may be trailed all the way from the cylinders to supply and exhaust and valve switching means at the water surface. Desirably, however, the hose lengths from the cylinders should be brought back through the wall of upper base section 9 to permanent connectors from which further lengths can be run up to the surface inside the caisson assembly.

The method of using the caisson of this invention will now be considered. Suppose first that access is desired to a section of submerged pipeline running horizontally. Divers must be sent down first to dig out around this section a space large enouch to let the lower base section halves of the caisson close around it. This digging may be done with hose jets. In the meanwhile calculations will have been made of the number of extension pieces 50 needed to keep the top of the caisson assembly above water, and the number of ballasting weights 48 needed to hold it on the bottom independently of restraint by the pipe. Complete blank adapters 38 would be fitted in the bottom aperture sleeves 39 and 40 and adapters of proper inner radius would be fitted in the side aperture sleeves 35 and 36.

Considering the lift available on the derrick of the barge which is to carry the caisson to operating location, the assembly of the basic caisson and its extension pieces will be completed at the surface to the extent possible. In the course of this assembly, sections of any installed ladders and pump lines will be aligned and connected. Finally bail 12 will be attached across the assembly. The barge derrick will then pick up the caisson assembly by the bail and let it down to the sea bottom with the lower base section halves in open position. When the caisson is in position around and on top of the pipeline, the hydraulic cylinders 15 and 16 will be actuated to close the lower base section halves, and the compressible linings of sleeve adapters 37 and 38 will seal around the pipeline.

With the caisson closed on the pipeline, ballasting weights 48 will next be lowered and hung on supporting bands 45 and 46. In case it has not been possible to build up the caisson to a sufficient height on the deck of the barge, bail 12 will be removed and additional extension pieces 50 lowered as needed for attachment underwater until the top of the caisson assembly protrudes above the sea surface. With the caisson fully assembled and ballasted and flooding valve 49 closed, pumping may be commenced. As the water level in the caisson is lowered, a differential pressure will be created inside and out the lower base section halves which will force these halves together for even tighter sealing of adapters 37 and 38 around the pipeline, and a flat bar flange 41 against channel flange 42 along the interface of the lower base section halves. This differential of pressure will also be exerted on closure collar 29. This collar will, however, be supported by solid structure for almost all of its extent, especially as it yields down onto the base flange of upper base section 9, and will not be unduly strained. When the caisson is substantially pumped out, mechanics may descend by the internal ladder to grating 44 and undertake work on the pipeline.

Upon the completion of work and the evacuation of personnel from the caisson, the caisson must be disengaged from the pipeline. To accomplish this the first step is to open flooding valve 49 and allow the caisson to be filled to the level of the surrounding water. Any extension pieces 50 which extend the caisson assembly to too great a height to be handled as a unit by the barge derrick are removed next. After that the ballasting weights are taken off. Finally hydraulic cylinders 15 and 16 are actuated to open the lower base section halves, and the caisson elements remaining underwater withdrawn to the surface.

When dry working access to a vertical pipe or pile is desired, the procedure of using the caisson of this invention is substantially the same as that just described. Differences are that the side aperture sleeves 35 and 36 are plugged with blank liners, and liners of the appropriate inner radius installed in bottom aperture sleeves 39 and 40. It may be unnecessary to do any of the preliminary digging around a vertical pipe or pile that was mentioned in the case of the horizontal pipeline, unless it be desired to have access to a pile at or below the level normally flush with the sea bottom.

In an actual reduction to practice of this invention, a caisson for submerged pipelines has been constructed having the following characteristics:

Height of upper and lower base section assembly _____ 12'–8"
Inside diameter of upper base section in cylindrical region (also inside diameter of extension pieces) _____ 4'–11"
Inside diameter of lower base section _____ 6'–11"
Inside diameter of opertures for entrance into caisson of horizontal and vertical pipes formed by permanently installed, semi-cylindrical sleeves _____ 21"
Height from axis of apertures for entrance of horizontal pipe to top of upper base section___ 9'–3"
Number of pockets on lower base section for accommodation of ballasting weights _____ 12
Weight of ballasting weights (each)_____ 3,835 lbs.
Height of extension pieces (each) _____ 6'–0"

Although this invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed. This understanding applies particularly to conformity with generally recognized design practices in the provision of stiffening means for those parts of this invention required to resist hydrostatic pressures, and in the making of watertight joints between parts abutting each other either continuously or intermittently or connected to each other either rigidly or flexibly.

What is claimed is:

1. A caisson for providing dry working access to a submerged pipeline comprising an upper base section in the form of a truncated conical shell surmounted by a cylindrical shell; a lower base section comprising two semi-cylindrical opposing shell halves disconnectedly matable in a vertical plane to form a concave upward, flat rimmed bowl of inside top diameter slightly larger than the outside bottom diameter of said upper base section, the line of mating of said lower base section halves being interrupted by at least one semi-circular relief cut-out in the mating edge of each section half, said cut-outs matching from one lower base section half to the other whereby at least one circular aperture in said lower base section is defined; hinge means connecting said upper and lower base sections so disposed that the bottom edge of said upper base section and the top edge of said lower base section are substantially flush when said lower base section halves are mated and that a pivot axis common to both of said lower base section halves substantially coincident with a diametral line through the top surface of said lower base section halves is provided; sealing means providing a watertight interface between said lower base section halves in mated position except where said line of mating is interrupted by said semi-circular relief cut-outs, and sealing means providing a watertight closure between said upper and lower base sections.

2. A caisson according to claim 1 in which said semi-circular relief cut-outs and the sleeves therein are so disposed in the mating edges of each of said lower base section halves that diametrally opposite apertures for horizontal passage of a cylindrical body through said lower base section are defined.

3. A caisson according to claim 1 in which said semi-circular relief cut-outs and the sleeves therein are so disposed in the mating edges of each of said lower base section halves that a circular aperture for vertical passage of a cylindrical body into said lower base section is defined.

4. A caisson according to claim 1, in which said hinge means connecting said upper and lower base sections comprises two leaf elements secured to the inside of each of said lower base section halves, two bracket elements secured to the inside of said upper base section having each a closely overlapping relationship with a leaf element from each of said lower base section halves, and a pin passing through each of said bracket elements and the leaf elements closely overlapping therewith and providing pivotable engagement therebetween.

5. A caisson according to claim 1 in which said sealing means providing a watertight interface between said lower base section halves in mated position, except where said line of mating is interrupted by said semi-circular relief cut-outs, comprises channel flange segments disposed to be concave outward along the mating edge of one of said lower base section halves, a lining of compressible material secured in said channel flange segments, and flat bar flange segments along the mating edge of the other of said lower base section halves, said flat bar segments being of such width and so disposed to be received within said channel segments.

6. A caisson according to claim 1 in which said sealing means providing a watertight closure between said upper and lower base sections comprises a collar of flexible, waterproof material fastened at its upper edge to said upper base section near the top of the conical region thereof, and at its lower edge to said lower base section halves along the upper rims thereof.

7. A caisson according to claim 1 which includes adapter means for reducing the diameter of said aperture to a preselected value, said adapter means being attached to said lower base section shell halves within said semicircular relief cut-outs.

8. A caisson according to claim 7 in which said adapter means comprises a partable and substantially rigid shell member having a lining of compressible material.

9. A caisson according to claim 1 which includes operating means disposed intermediate said upper base section and said lower base section halves whereby each of said lower base section halves may be turned on said hinge means with respect to said upper base section.

10. A caisson according to claim 9 in which said operating means comprises at least one fluid powered piston and cylinder assembly pivotably connected to each of said lower base section halves and said upper base section.

11. A caisson according to claim 1 which includes a flooding valve set in the wall of said upper base section wherethrough water may be admitted to the interior of said caisson.

12. A caisson according to claim 1 which includes a support structure circumferentially disposed around the outer surface of said lower base section halves, and at least one ballasting weight detachably engaged therewith.

13. A caisson according to claim 1 which includes at least one extension piece comprising a cylindrical shell of substantially the same diameter as said upper base section detachably mounted upon the upper end of said upper base section.

14. A caisson for providing dry working access to a submerged pipeline comprising an upper base section in the form of a shell; a lower base section comprising two opposing shell halves disconnectedly matable in a vertical plane to form a concave upward bowl, the line of mating of said lower base section halves being interrupted by at least one relief cut-out in the mating edge of each section half, said cut-outs matching from one lower base section half to the other whereby at least one aperture in said lower base section is defined; hinge means connecting said upper and lower base sections, said hinge means permitting relative motion between each of said lower base section halves and said upper base section as said lower base section halves are moved into and out of mated position; sealing means providing a watertight interface between said lower base section halves in mated position except where said line of mating is interrupted by said relief cut-outs, and sealing means providing a watertight closure between said upper and lower base sections.

15. A caisson according to claim 14, said upper base section thereof extending above the surface of water wherein said pipeline is submerged with said lower base section halves being in mated position around said pipeline passing through said aperture, and said upper base section being open to the atmosphere.

References Cited in the file of this patent

UNITED STATES PATENTS

| | | |
|---|---|---|
| 702,324 | McIlurid | June 10, 1902 |
| 859,931 | Earll | July 16, 1907 |
| 2,636,354 | Slasgold | Apr. 28, 1953 |
| 2,667,751 | Osborn | Feb. 2, 1954 |
| 2,791,019 | Du Laney | May 7, 1957 |
| 2,812,641 | Elliot | Nov. 12, 1957 |

FOREIGN PATENTS

| | | |
|---|---|---|
| 15,020 | Great Britain | Oct. 28, 1893 |